(12) United States Patent
Kneringer et al.

(10) Patent No.: US 7,089,972 B2
(45) Date of Patent: *Aug. 15, 2006

(54) GLYCOL PROPORTIONING PANEL

(75) Inventors: Ken Kneringer, Indianapolis, IN (US); Jessie Nance, Noblesville, IN (US)

(73) Assignee: Edwards Electrical & Mechanical, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/876,366

(22) Filed: Jun. 24, 2004

(65) Prior Publication Data

US 2005/0178915 A1 Aug. 18, 2005

Related U.S. Application Data

(63) Continuation of application No. 10/202,593, filed on Jul. 24, 2002, now Pat. No. 6,766,836.

(60) Provisional application No. 60/307,430, filed on Jul. 4, 2001.

(51) Int. Cl.
*B65B 1/04* (2006.01)

(52) U.S. Cl. ............................ 141/9; 141/100; 141/198

(58) Field of Classification Search ................ 141/198, 141/100, 9, 83, 104; 222/129; 244/134 C, 244/134 R; 137/93, 9

See application file for complete search history.

(56) References Cited

U.S. PATENT DOCUMENTS

| 4,986,497 A | * | 1/1991 | Susko | 244/134 C |
| 5,154,314 A | * | 10/1992 | Van Wormer | 222/1 |
| 6,766,836 B1 | * | 7/2004 | Kneringer et al. | 141/100 |

* cited by examiner

*Primary Examiner*—Steven O. Douglas
(74) *Attorney, Agent, or Firm*—Woodard, Emhardt, Moriarty, McNett & Henry LLP

(57) ABSTRACT

A glycol proportioning station that provides a deicing mixture of glycol and water to tank trucks that in turn spray the deicing mixture onto aircraft. The invention includes a remote control that is positioned where the truck is loaded and which runs in parallel with the controls on the main unit of the system. The proportioning system operates with an economy of parts by employing constant flow rates of both water and glycol. The desired percentage of glycol in the effluent is obtained by initially setting the position of one or more modulating valves provided on each of separate water and glycol lines and then employing a refractometer feedback loop to modulate the flow in one or both of the input lines. A static mixer positioned along the effluent line upstream of the in-line refractometer provides a uniform glycol-water mixture. The system provides other novel features such as a "last fill" option that prevents the system from freezing when it is not being used.

6 Claims, 7 Drawing Sheets

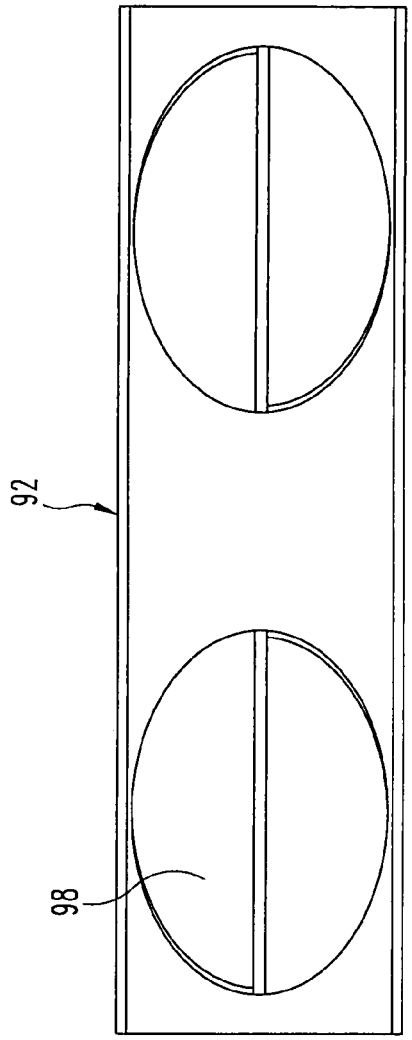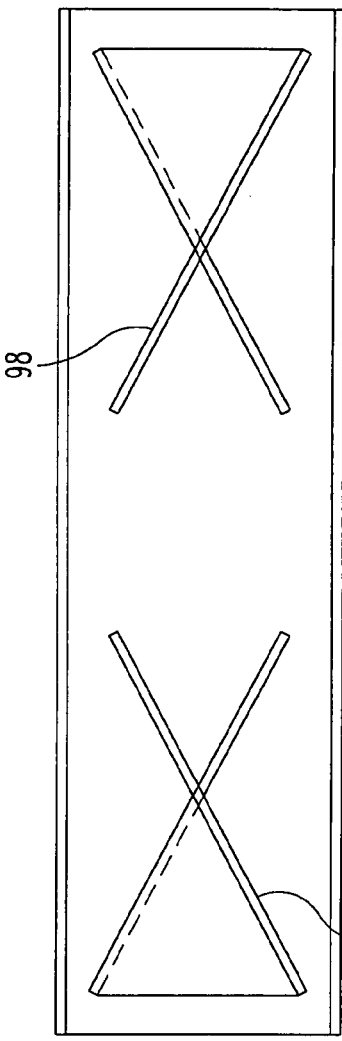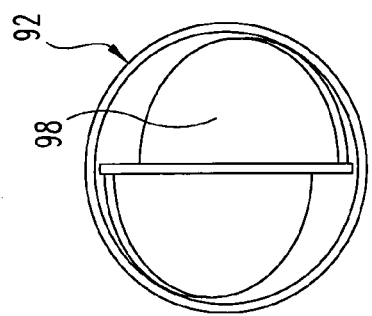

GLYCOL PROPORTIONING PANEL

CROSS REFERENCE TO RELATED APPLICATIONS

This application is a continuation of U.S. patent application Ser. No. 10/202,593, filed Jul. 24, 2002 now U.S. Pat. No. 6,766,836.

FIELD OF THE INVENTION

The present invention relates generally to aircraft de-icing operations and more particularly to apparatus that mix and dispense deicing liquids that are in turn sprayed onto aircraft.

BACKGROUND

In northern climates during winter months, aircraft which are either parked on the ground overnight or which are on the ground during severe winter weather frequently accumulate snow or ice on the airfoil surfaces. It is thus necessary to remove this material prior to takeoff and such removal has been the subject of a variety of deicing equipment in the prior art. The typical approach is to apply deicing compositions to aircraft in wintery weather before takeoff to deice them and to prevent ice from forming for a certain period (the so-called "hold-over time"). This goal is frequently achieved with mixtures of water and ethylene glycol or water and propylene glycol The most popular equipment to apply the deicing mixtures are self-contained trucks having an extendible and maneuverable boom mounted thereon and a tank containing the deicing mixture. The truck typically includes a self-contained heater that heats the glycol-water mixture to 160 to 190 degrees Fahrenheit. The heated deicing fluid is then pumped through a hose to the end of the boom where the operator directs a stream of the heated deicing fluid mixture from a nozzle onto the aircraft. This procedure removes the snow and/or ice and provides a coating of glycol which largely prevents further formation of the freezing substance during the hold-over time. This deicing procedure normally takes place on the tarmac just prior to the plane's departure after which the aircraft's normal internal electrical deicing systems are employed.

It is known to provide "glycol proportioning panels," as they are known in the art, that mix water and pure ethylene or propylene glycol and provide the mixture to the trucks that in turn spray it onto the aircraft. Most of these known proportioning panels are large, ungainly, expensive and offer limited mixing functionality.

For example, one disadvantage of these known proportioning systems is that the desired ratio of glycol to water is typically limited to only three or four settings. However, to minimize glycol waste and to optimize the mixture for a given weather condition, more selections of glycol mixtures are desirable. Another disadvantage to presently available glycol proportioning panels is that the systems are housed in a building that may be hundreds of feet from where the truck that sprays the mix onto the aircraft is loaded. The mixture is piped over this distance. The distance between the main unit and the location where the effluent is being dispensed can create a communication problem between the operator of the panel who is located in the building, and the personnel who are loading the truck, who are outside and several hundred feet away.

Another disadvantage of known proportioning systems is that they employ variable speed or frequency pumps to proportion the percentages of glycol and water. In addition to creating more process variables to be monitored, the variable speed pumps can be undesirably slow.

Systems relying on multiport computer controlled valves to mix glycol and water are also known. For example, U.S. Pat. No. 4,842,005 (Hope et al.) discloses a glycol proportioning station wherein water is pumped by a pump and its flow rate measured by a flow meter. Glycol is pumped through another pump and through a multi-port valve, which has multiple ports of different sizes that are pneumatically opened or closed in response to pre-programmed signals from a controller that is coupled to the multiport valve. In use, the water flow rate is sensed and the flow of glycol is controlled by the multi-port digital valve, which opens and closes any number of ten possible elements, or parts, to accommodate the required flow.

It is also known in the art to use refractometers with glycol mixing systems for aircraft. For example, U.S. Pat. No. 4,986,497 to Susko discloses a deicing system in which a refractometer is used to monitor the mixed fluid and adjust flow of the glycol and water lines as necessary. Separate supply lines provide controlled flows of water and glycol to a wye-connection point. Each supply line has its own pump and throttling valve to control flow, as directed by a microprocessor. The system includes a heat exchanger into which fluid is recycled until the glycol mix reaches the desired temperature and until the refractive index read by a refractometer has reached the set point. The refractometer output signal indicates whether the refractive index is at, below, or above the set point. If below the set point, the microprocessor adjusts a valve on the glycol line to add glycol to the mix; if above the set point the microprocessor adjusts the valve on the water line to add water to the mix. Once the correct temperature and refractive index are recognized at the microprocessor, a valve is opened on the effluent line and the mixture is delivered.

U.S. Pat. No. 4,275,593 (Thornton-Trump) discloses an aircraft deicing system which includes a specific gravity meter that displays the glycol percentage to an operator positioned in a basket and a lever to adjust the glycol percentage in the effluent. By adjusting the lever, the operator may vary the amount of pure glycol fed into the mixture line and thereby adjust the glycol percentage in the effluent.

In summary, known glycol proportioning panels can be expensive, slow and inflexible. What is needed is a glycol proportioning panel that addresses these drawbacks.

SUMMARY

The present invention provides a glycol proportioning station that provides a deicing mixture of glycol and water to tank trucks that in turn spray the deicing mixture onto aircraft. The invention includes two independent ways to modulate flow in the separate glycol and water lines that are merged into the effluent. The first method involves measuring the flow rates in the individual glycol and water lines, totalizing them and calculating the percentage of glycol in the effluent. The second method involves reading the refractive index of the effluent and converting it to glycol concentration.

The system's refractometer can thus be used as a back-up to check the glycol concentration of the effluent, and a visual or audible warning signal can be activated when the percentage of glycol in the effluent, as read by the refractometer, is outside of the set tolerance, typically about two (2)

percent. In another form of the present invention, the refractometer can be used in a feedback loop which includes a microprocessor to adjust flow control valves instead adjusting them based upon the flow meters. In another preferred form, the flow can be initially set by adjusting one or more characterized ball valves on one or more of the glycol or water input lines. Then, after flow has reached substantially steady state, flow can be modulated by means of the refractometer feedback loop just discussed.

In another embodiment of the present invention, a remote control is positioned where the truck is loaded and runs in parallel with the controls on the main unit of the system. The main unit includes a first control panel having a first display mounted thereon for controlling the operation of the proportioning station. A remote control panel having a second display is located a distance from the main unit, and is capable of operating the main unit in parallel with the controls on the main unit.

In another form thereof, the present invention provides a method of obtaining a desired mixture of glycol and water for use in deicing aircraft. The method comprises providing two input lines, one adapted to transport glycol and the other adapted to transport water, and merging the lines into an effluent line. Substantially constant flow of glycol and water is provided to the two input lines, respectively. Preferably, the flow rates are matched by adjusting a pressure reducing valve on the line which has the greater maximum flow. The flow rates in the two input lines are monitored and glycol percentage in the effluent is calculated therefrom. The refractive index of the effluent is monitored with a refractometer and converted into glycol concentration. The glycol concentration measured from the refractometer is compared to the calculated percentage of glycol. Finally, if the glycol concentration measured from the refractometer is outside a predetermined tolerance, either an error signal is produced or the system employs a feedback loop to adjust one of the flow control valves.

One advantage of the present invention is that it provides an accurate yet reliable system for proportioning a mixture of water and glycol. Advantageously, the system includes two separate means for determining glycol concentration. The system's on-line refractometer can be used to verify the accuracy of the glycol percentage calculated by measuring the individual flow rates of glycol and water, or it can be used as an independent means for modulating glycol or water flow. The system also provides the capability of initially mixing based upon flow rates then later mixing based upon the refractometer reading.

Another advantage of the present invention is that the proportioning station can be controlled proximate the tank truck which will spray the mix on the aircraft. This avoids communication problems between the operator of the station and the operator filling the truck, and thereby makes it easier to accomplish the job. The remote panel may also allow the dispensing of the glycol mix to be accomplished with one less person.

Another advantage of the present invention is that it uses substantially constant flow, which allows a much quicker fill time. Flow rates up to 300 gallons per minute or more are possible, which is much faster than systems employing variable frequency pumps.

Yet another advantage of the present invention is that it is economical. Glycol stations employing the present invention may cost only a fraction of the cost of competing glycol proportioning stations, which can ultimately help reduce the cost of air travel.

Still another advantage of the present invention is that it provides a uniform mixture of glycol and water with an economy of moving parts. This is accomplished by building a static mixer into the effluent line downstream of the manifold which merges the glycol and water streams. The static mixer provides uniform mixing under very low temperatures or if thickening agents are added to the glycol.

BRIEF DESCRIPTION OF DRAWINGS

The above-mentioned and other advantages of the present invention, and the manner of obtaining them, will become more apparent and the invention itself will be better understood by reference to the following description of the embodiments of the invention taken in conjunction with the accompanying drawings, wherein:

FIGS. 3A–3D are various illustrations of a static mixer in accordance with the present invention;

Corresponding reference characters indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
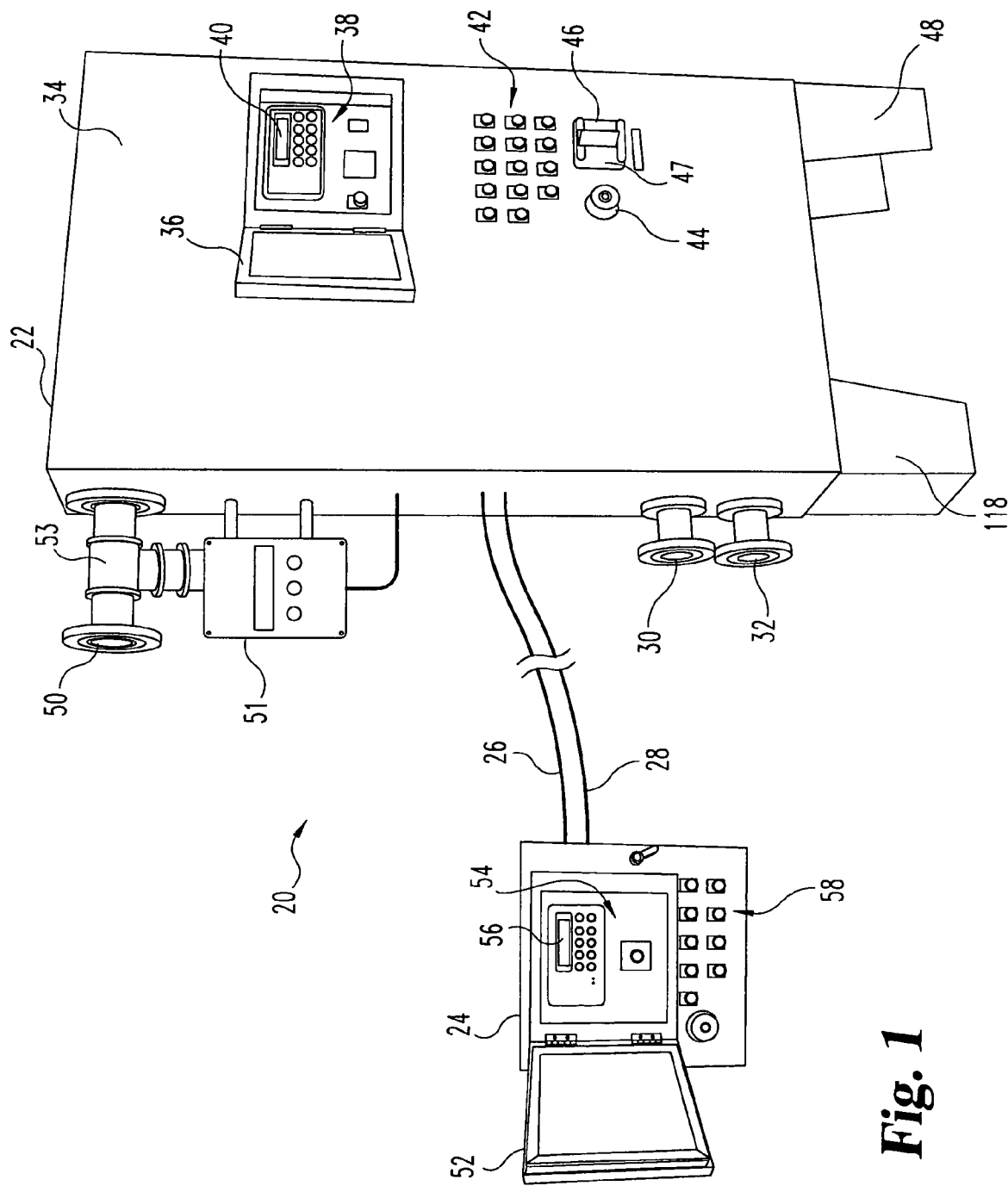
FIG. 1 is a perspective view of a glycol proportioning station in accordance with the present invention and which also illustrates a portable panel for remotely controlling the proportioning station.

Referring now to FIG. 1, glycol proportioning station 20 includes main unit 22 and remote control unit 24 communicably connected to one another by wires 26 and 28. Glycol inlet 30 and water inlet 32 are adapted to receive glycol from a supply tank (not shown) and water from a municipal supply (not shown). A pump/starter 31 which is powered by unit 22 (see FIG. 2) supplies pure glycol from a tank (not shown) and feeds it into inlet 30. The mechanical fittings of inlets 30 and 32 can be any of a wide variety of commercial fittings, quick disconnects, and the like. Unit 22 includes a hingedly attached front cover panel 34 (see FIG. 2) which is fitted with a smaller door 36 behind which are controls 38 and display 40. Also disposed on front cover panel 34 are a series of push buttons and lights 42, whose specific operations will be described in more detail below. An "emergency stop" button 44 allows the operator to shut down the system at any time. Strobe light 46 flashes and speaker 47 sounds an audible alarm to indicate a low temperature condition. Unit 22 includes legs 48 that are formed of angled steel welded to the body of panel 22, which is also formed of steel. Optionally, the body of panel 34 can be formed of stainless steel. Outlet 50 dispenses a mixture of glycol and water in a desired concentration.

An in-line refractometer 51 is mounted to unit 22 and monitors the refractive index of the mixture of glycol and water passing through coupling 53 and correlates the index to the concentration of glycol. Refractometer 51 measures the concentration of glycol in the mixture by measuring refractive indices as is known in the art and feeds the concentration back to processor 104, discussed below. Alternatively, the refractometer can supply the refractive index to processor 104, and processor 104 can convert the index to concentration of glycol. An in-line refractometer suitable for the present invention is available from AFAB Enterprises, Eustis, Fla., Part No. PR-111. Although it is envisioned that other refractometers may also work well, it is important that the refractometer maintain a steady reading under high and erratic or turbulent flow conditions. As discussed below, a static mixer is disposed in the effluent line in close proximity upstream of refractometer 51, which causes turbulence, which in turn can be problematic if the refractometer does not perform well under such flow conditions. Furthermore, typical flow rates from outlet 50 can exceed 300 gallons per minute, and the refractometer must be able to provide an accurate reading under such high flow conditions.

Again referring to FIG. 1, remote control unit 24 includes a hingedly attached door 52, controls 54, display 56 and push buttons and lights 58. Essentially, remote control 24 allows an operator to control the glycol proportioning station in parallel with or instead of operating the station from main unit 22. The length of cables 26 and 28 can be adjusted to any desired distance, as dictated by the distance between the location of main unit 22, which is typically inside, and the position of the truck to be loaded, which can be several hundred feet away from unit 22.

Figure 2:
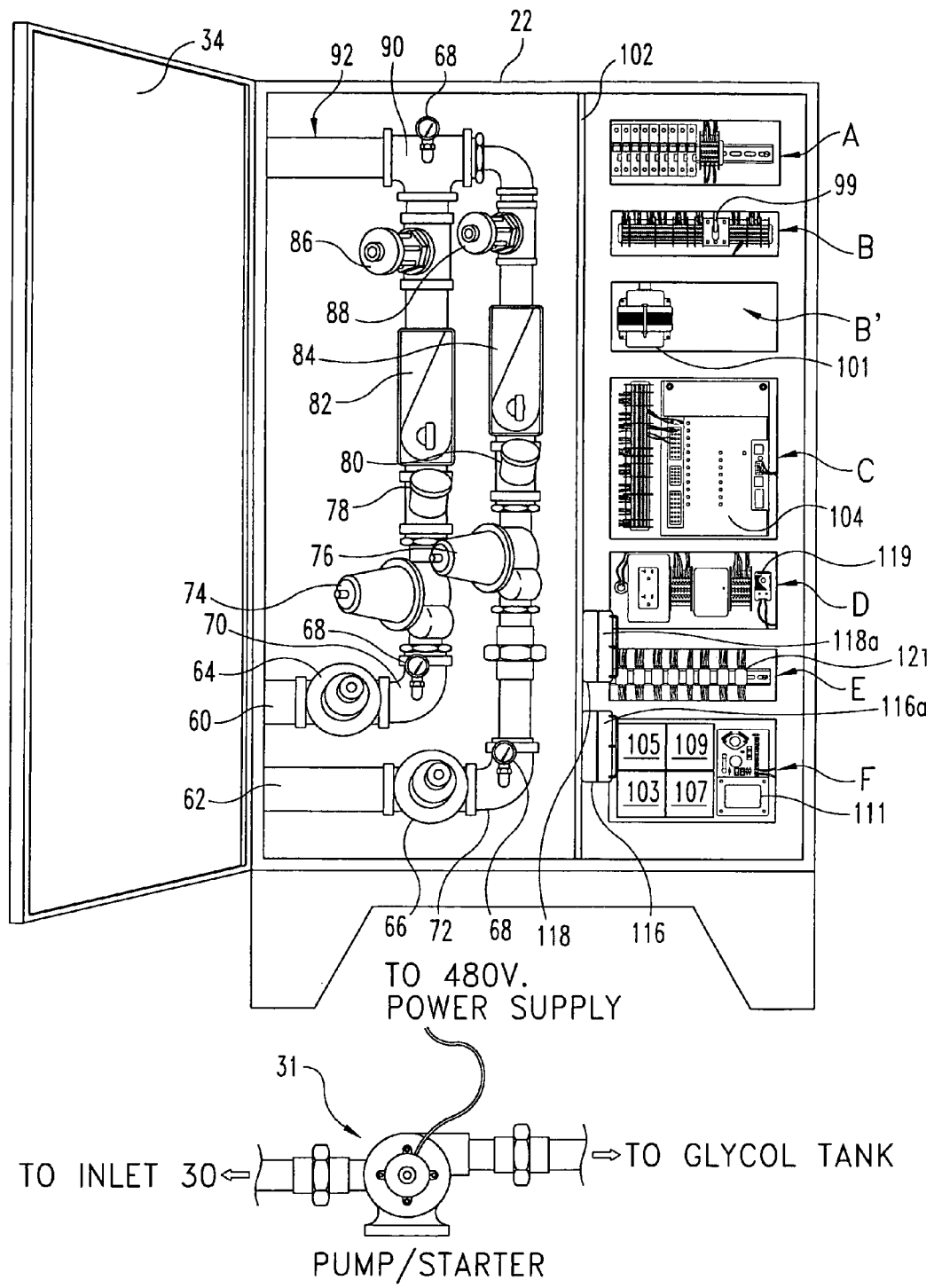
FIG. 2 is a perspective view of the interior of the main panel of the glycol proportioning station shown in FIG. 1.

Turning now to FIG. 2, glycol line 60 and water line 62 extend from the bottom to the top of the panel's interior and include several components therealong. First, lines 60 and 62 feed into solenoids 64 and 66, respectively. Standard pressure gauges 68 are disposed about elbows 70 and 72 of lines 60 and 62, respectively. Next along glycol and water pipes 60 and 62 are pressure reducing valves 74 and 76, respectively, which may be used to match the flow rates of the incoming water and glycol lines 62 and 60, as described below. Next along lines 60 and 62 are one way valves 78 and 80, followed by "Belimo valves" 82 and 84. The Belimo valves are electrically connected to system processor 104 for communication therewith, as described below, and are automatically adjusted by same before the start of the operation. The Belimo valves are known in the art as "characterized ball valves" and are believed important to modulating flow in the present invention. The Belimo valves suitable for use with the present invention are available from the Belimo Co., Danbury Conn., Part No. B-249. After the Belimo valves, turbine wheel flow meters 86 and 88 are disposed along lines 60 and 62, respectively, and are connected to processor 104 to feed flow information thereto. Lines 60 and 62 merge into manifold 90 which also includes a pressure gauge 68 mounted thereto. The water and glycol coming together in manifold 90 are fed into static mixer 92, which enhances mixing.

Figure 3A:
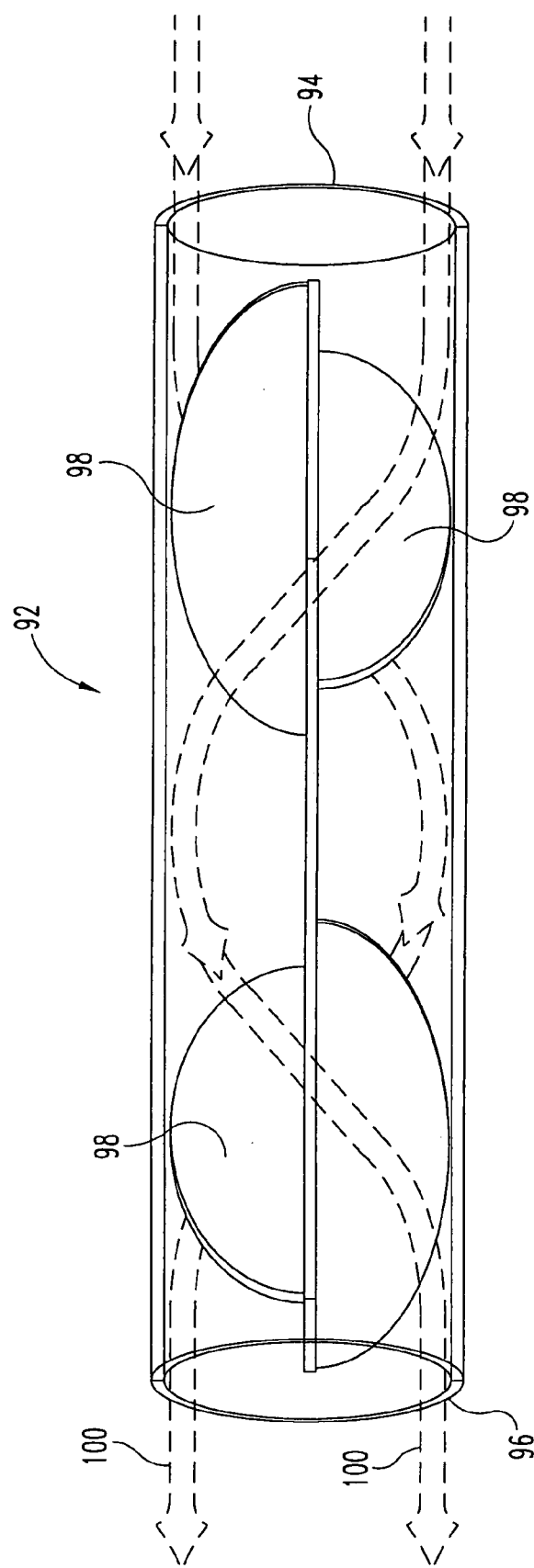

Turning now to FIG. 3, the details of static mixer 92 can be more fully appreciated. Mixer 92 includes inlet 94 and outlet 96 and includes baffles 98 therebetween that are welded or otherwise fixed to the inside walls of mixer 92. The baffles mix the glycol and water in the direction of arrows 100. FIGS. 3B, 3C and 3D illustrate the baffles 98 from the top, side and end, respectively. It can thus be appreciated that the baffles create a swirling effect that produces substantially uniform mixing of glycol and water such that a uniform mixture exits outlet 50.

Returning now to FIG. 2, the componentry installed on the right side of divider 102 in unit 22 is described from top to bottom. First, block A includes 120 volt circuit breakers for various system components. Each specific circuit breaker is noted in the top left portion of FIG. 4. Terminal block B shown in FIG. 2 includes inputs and outputs for the heaters, the solenoids, etc. as shown and described more fully in FIG. 4. In the middle of block B is a power switch 99 that turns on/off with the closing/opening of panel 34. Block B' includes a 120 volt to 24 volt transformer 101 to supply power to the 24 volt componentry in the panel. Block C includes processor 104 that uses a 2–10 volt output to control Belimo valves 82 and 84. The Belimo valves 82 and 84 return 2–10 volt signals that are fed into rescaling modules 103 and 105 contained in block F. In turn, the resealing modules 103 and 105 send 1–5 volt signals back to processor 104. Also included in block F are two cards 107 and 109, one for each flow meter 86 and 88, that pulse every 4.73 gallons from the flow transmitters to keep track of fluid totals. Also included in block F is a DC power supply 111 which operates in-line refractometer 51.

With further reference to FIG. 2, primary and secondary heaters 116 and 118 are mounted on divider wall 102 and include fans 116a and 118a mounted thereon to blow warm air and keep the interior of unit 22 sufficiently warm to prevent freezing in the piping. There is a thermometer (not shown) disposed on the piping side of unit 22 which feeds into microprocessor 104 and the microprocessor in turn controls heaters 116 and 118. Block D includes an alarm temperature controller 119 that engages strobe 46 and speaker 47 should the temperature within unit 22 fall below 40 degrees Fahrenheit or other pre-selected minimum temperature. The alarm temperature controller serves as a backup should processor 104 fail. Block E includes relays 121 for the various components.

Figure 5:
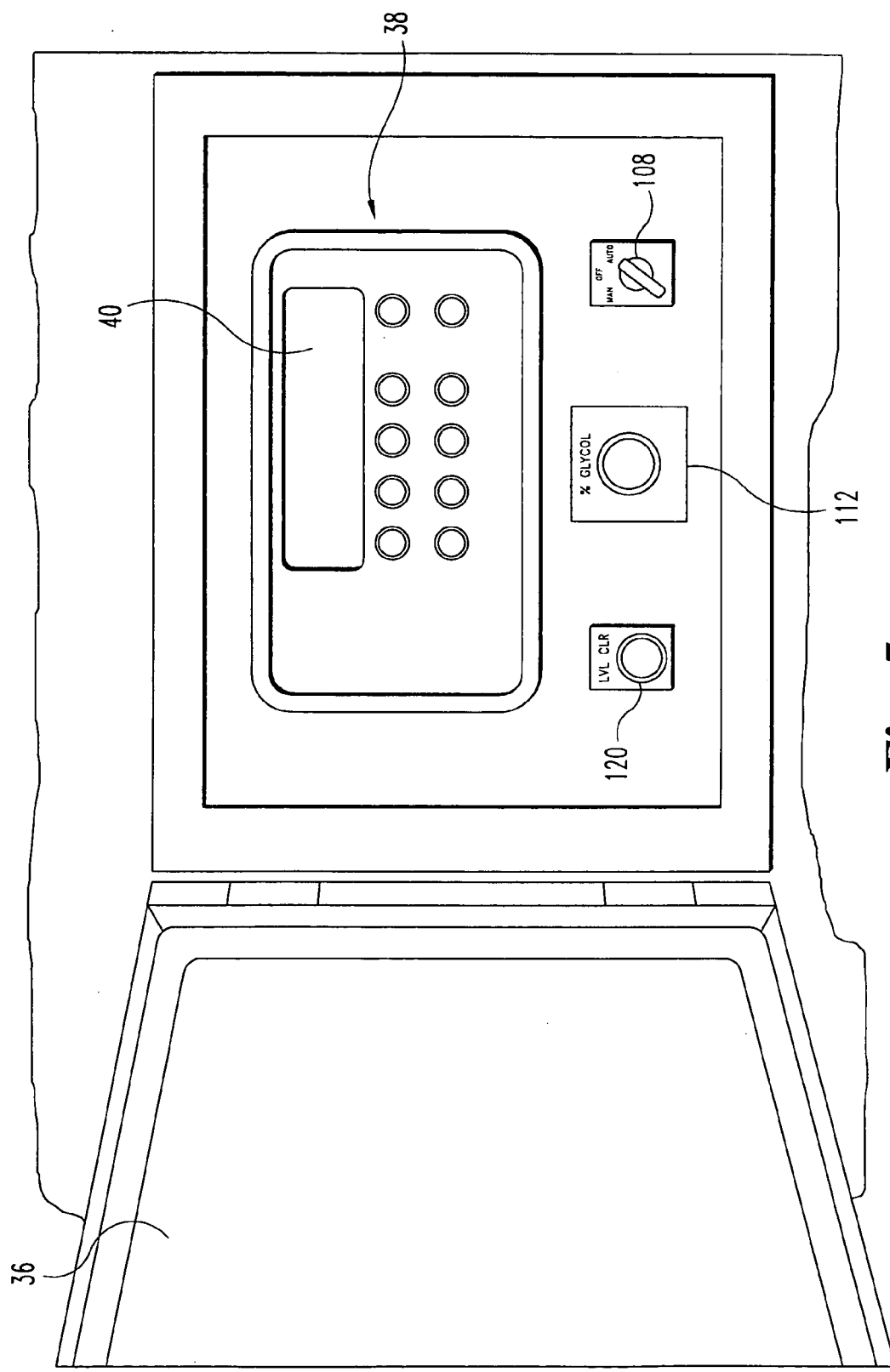
FIG. 5 is a perspective view illustrating the controls for the glycol proportioning station of the present invention.
Figure 6:
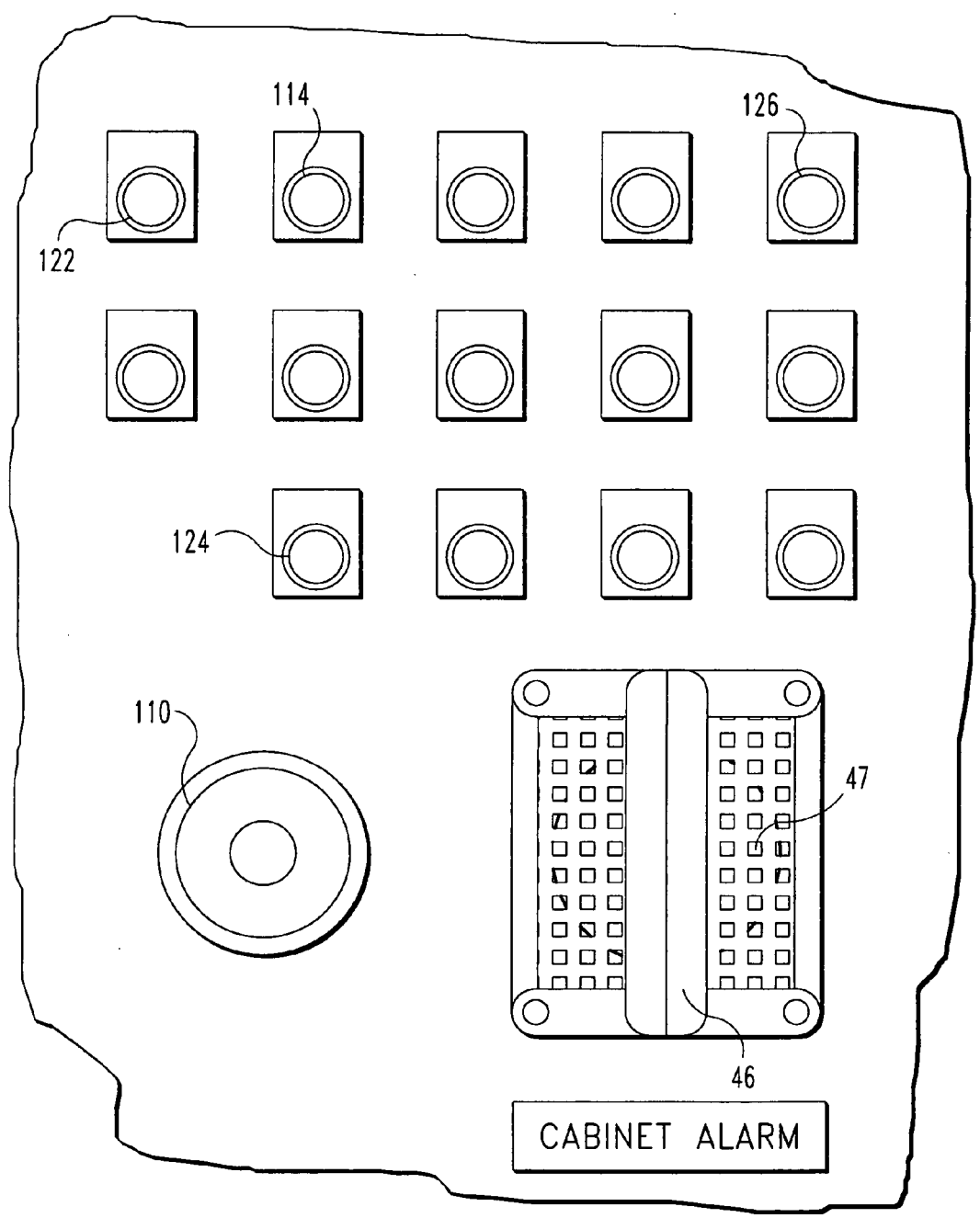
FIG. 6 is a plan view illustrating more of the controls for the glycol proportioning station of the present invention.

The operation of proportioning station 20 will now be explained with reference to the controls illustrated in FIGS. 5 and 6. When system 20 is initially set up at a facility, one or the other of pressure reducing valves 74 or 76 is constricted so that the both lines 60 and 62 provide approximately the same constant volume input. For example, system 20 is run with the valves wide open, and if the glycol flow were 160 gallons per minute (gpm), whereas the water flow were 150 gpm, the glycol pressure reducing valve 74 would be constricted so as to match the glycol flow rate to that of the water, 150 gpm. Water is often provided directly from a municipal source and in such cases it is easier to match the glycol flow to water, rather than vice versa. The pressure reducing valves need not be readjusted unless the incoming flow rates of water or glycol were to change. This pre-positioning of the valves to provide matched flow rates is a manual step performed on initial start up.

For normal operation, the operator ensures that station 20 is in the "auto mode" by moving switch 108 to the "auto" position (FIG. 5), and that emergency stop 110 (FIG. 6) is fully pulled out. Next, the desired glycol percentage is selected by adjusting dial 112 as shown in FIG. 5. The foregoing steps cause processor 104 to send a signal to Belimo valves 82 and 84 (FIG. 2) so these valves initially adjust their positions so that the relative flow of water and glycol therethrough matches the desired ratio of glycol to water selected with dial 112. Once the Belimo valves are in the position as determined by the position of dial 112, the operator pushes start button 114 (FIG. 6), which in turn activates solenoids 64 and 66 to allow water and glycol to flow. Starter/pump 31 activates upon depressing start button 114. The pump 31 pumps glycol into inlet 30 and its suction end is connected to a tank (not shown) of pure glycol as indicated in FIG. 2.

Thus, the positions of the Belimo valves 82 and 84 are initially adjusted based upon receiving at their inputs matched flow rates of glycol and water and water. For example, if 55% glycol were dialed in to dial 112, Belimo valve 84 would have to be throttled back or partially closed upon the initial setting being dialed in with dial 112, since otherwise the flow would remain as received, roughly 50% glycol.

Once operation begins, turbine wheel flow meters 86 and 88 measure flow and send a signal to processor 104 which in turn displays the actual mix percentage being delivered on display 40. Processor 104 can send a signal to Belimo valves 82 and/or 84 to modulate one or both such that the mix percentage coincides with that selected on dial 112. Optionally, refractometer 51 can also feed back into processor 104 and in turn processor 104 can adjust Belimo valves 82 and 84 to correct the percentage of the mixture being delivered from outlet 50. This is defined as the "refractometer feedback loop."

In one embodiment of system 20, the flow rates of lines 60 and 62 are measured and totalized by turbine flow meters 86 and 88, and the percentage of glycol in the effluent 50 is calculated by processor 104. In turn, processor 104 throttles either Belimo valve 82 or 84 to adjust for variations in glycol percentage and bring the calculated glycol percentage within tolerance. Additionally, refractometer 51 includes display 53 that indicates the glycol percentage of the effluent stream independently of the totalizing method just discussed. If system 20 is operating within tolerance, the value indicated on display 53 should substantially correspond with the value indicated on display 40. In this embodiment, if the display. 53 and display 40 differ by more than a predetermined amount, an error signal can be produced. Mix fail light 126 is then illuminated. Thus, this embodiment provides a back-up system to measure glycol concentration in the effluent.

In another embodiment; refractometer 51 is operably connected to processor 104 and sends a signal thereto corresponding to glycol effluent concentration in 20 output 50. Processor 104 then compares the glycol concentration in output 50 as measured from refractometer 51 to the calculated percentage of glycol obtained from totalizing the turbine flow meters 86 and 88, discussed above. Processor 104 then sends a valve readjust signal to either Belimo valve 82 or 84, the valve readjust signal causing valve 82 or 84 to at least partially open or close. (It is preferable to configure system 20 so that the valve corresponding to the flow which fluctuates less is adjusted. Typically, this corresponds to the glycol line 60.)

In another embodiment, one or both flow control valves 82 and 84 are initially set based upon receiving equal flow rates of water and glycol, as is achieved by adjusting one of the pressure reducing valves 74 or 76. This initial setting begins before fluid begins to be pumped into lines 60 and 62. Once system 20 reaches substantially steady state proportioning, the refractometer feedback loop takes over and one or both flow control valves 82 and 84 are modulated by refractometer feedback loop described above. This method of initially setting the valves based upon desired glycol percentage as selected, then modulating the Belimo valve(s) based upon the refractometer reading has been found to be particularly desirable because it is manageable and accurate.

After sending the readjust signal to the Belimo valve, processor 104 then waits a predetermined time, and rechecks the reading from refractometer 51. This process is repeated until (1) the reading is brought to within a pre-defined tolerance (typically 2%) of the desired concentration or (2) until the Belimo valve reaches the maximum extent to which it can open or close, in which case an error signal occurs; namely, mix fail light 126 illuminates. The extent to which the Belimo valve can be throttled is limited so as to avoid alternately driving the valve open and closed. It has been found that a maximum adjustment of about of 25 gpm is preferable.

Other functions of the controls 38 and 40 include level override 120 (FIG. 5) which allows the operator to run the glycol pump even though the system is indicating that the glycol tank is empty. Such might be the case when, for example, the operator wishes to use the glycol pump 31 as an off-load application to load into an empty glycol tank. To maintain the override condition, the operator must keep button 120 depressed.

Station 20 also provides a "last fill" option. Typically, for the last run of the evening, the operator would simply push last fill button 122 (FIG. 6) and, irrespective of the position of dial 112, processor 104 will automatically position Belimo valves 82 and 84 such that a 55% glycol mixture is dispensed. This acts as purge such that a residual amount of this higher (55%) concentration of glycol will remain in the discharge piping and prevent it from freezing when the system is shut down and unused for several hours, as occurs typically in the evening. To leave the "last fill" mode, the operator simply presses reset button 124, and when the next cycle begins the processor will return the valves to the setting indicated on dial 112. "Mix Fail" light 126, when illuminated, indicates that the percentage of glycol in the mixture exiting outlet 50 is outside of a predetermined tolerance, typically 2%, as discussed above. This can happen when the Belimo valves become maladjusted, water pressure drops, pump pressure fails, or the refractometer feedback loop described above cannot bring the percentage glycol to within tolerance of the desired concentration. The mix fail signal is preferably sent by in-line refractometer 51 as well as the percentage of glycol as measured by flow meters 86 and 88 and totalized by processor 104. In this regard, in-line refractometer 51 can be configured as a backup to or replacement for flow meters 86 and 88. Station 20 can be programmed to shut down completely in the event of a "mix fail" condition or simply illuminate light 126.

The controls also include a high pressure light which would indicate, for example, that a valve had shut off on the discharge side of pump 31. The tank level light can be operatively connected to a float in the pure glycol supply tank (not shown) such that the tank level light illuminates when the float moves below a designated level within the tank.

Returning now to FIG. 1, remote control 24 can be located several hundred yards away from the building in which main unit 22 is located. The remote control is wired in parallel with the controls 38 and 42 on unit 22. Wire 26 is a multi conductor cable that carries signals for all of the functionality of the control buttons and lights whereas line 28 is a twisted 4-conductor cable for communications between the remote display and the display on unit 22. Thus, an operator can be positioned at the truck which is being filled by a line (not shown) running from outlet 50. In turn, after the truck is filled, it will heat the mixture and spray it onto a plane to de-ice same.

Figure 4:
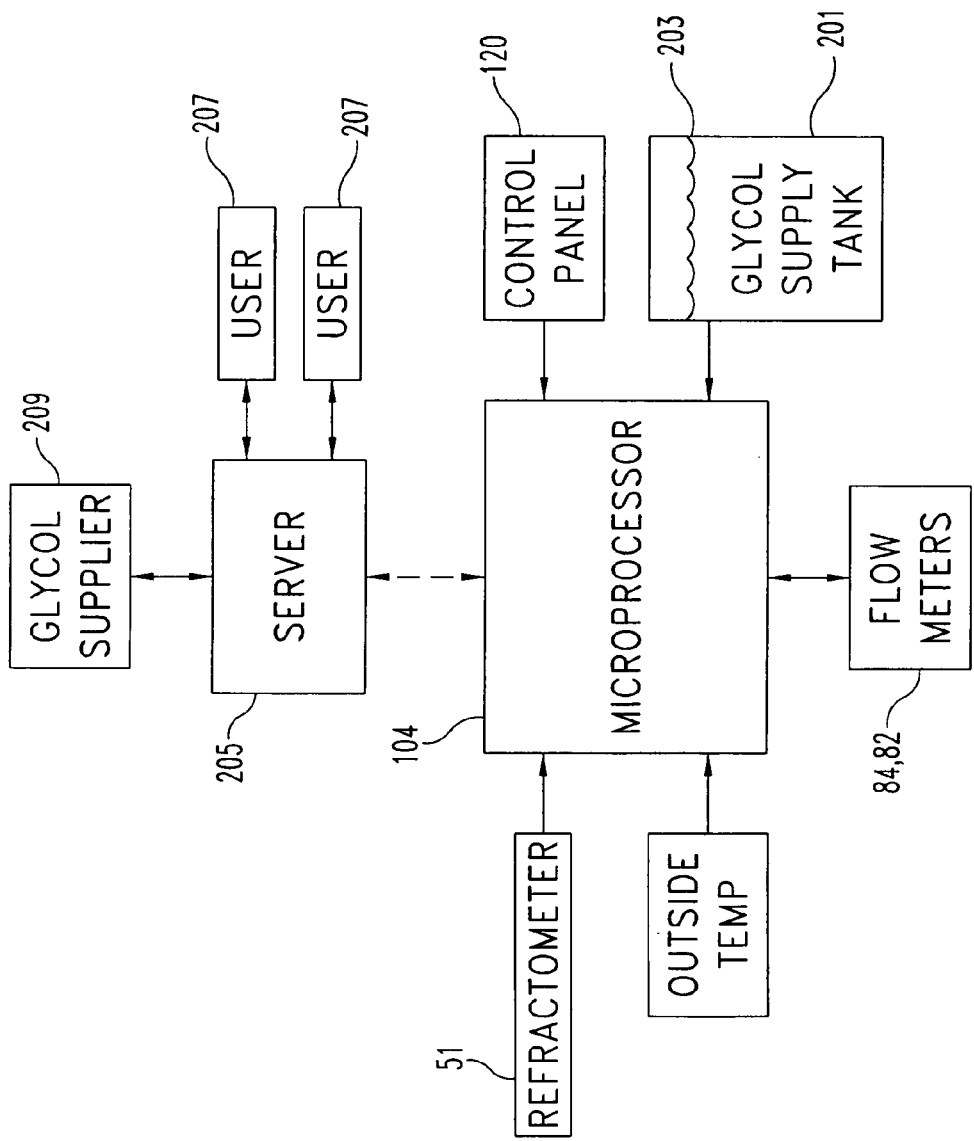
FIG. 4 is a flowchart diagram illustrating web enablement of the system in accordance with the present invention.

Another embodiment of the present invention relates to web enablement, as shown with reference to FIG. 4. On advantage of web enablement is to facilitate a method of automatically refilling the glycol supply tank 201 for system 20. With reference to FIG. 4, microprocessor 104 is in communication with the glycol proportioning panel 20. A tank level signal is sent from the glycol supply tank 201 to microprocessor 104, and microprocessor 104 thereby monitors the level 203 of glycol in the glycol supply tank 201.

Upon the level of glycol in the tank declining to a predetermined value, microprocessor 104 creates and sends an electronic message (e.g., "email") over a communications network to a server 205. In turn, the message may be relayed to one of more users 207, one of whom may send another electronic message through server 205 to a glycol supplier 209, who then knows it is time to transport fresh glycol to and fill glycol tank 201 in response to the email message. Alternatively, the electronic message can be sent directly from microprocessor 104 through server 205 to glycol supplier 209, e.g., to glycol supplier 209's email address.

Other web enablement features and variations thereof would be apparent to one of ordinary skill in the art with knowledge of this disclosure, and are within the scope of this invention. For example, the users could monitor in real time the reading from refractometer 51, the totalized flow as calculated from the flow measured by flow meters 82 and 84, and the outside temperature at the airport where deicing is taking place.

While a preferred embodiment incorporating the principles of the present invention has been disclosed hereinabove, the present invention is not limited to the disclosed embodiments. Instead, this application is intended to cover any variations, uses, or adaptations of the invention using its general principles.

What is claimed is:

1. A method of obtaining a desired mixture of glycol and water for use in deicing aircraft, said method comprising the steps of:
   (a) providing two input lines, one of said input lines adapted to transport glycol and the other of said input lines adapted to transport water, said input lines being merged into a common effluent line;
   (b) selecting a desired percentage of glycol in said effluent line and adjusting at least one valve disposed on at least one of said input lines to control the relative flow of glycol and water in said input lines to achieve said desired glycol percentage; and
   (c) monitoring the refractive index of the flow in said effluent line with a refractometer and converting said refractive index to a glycol concentration.

2. The method of claim 1, further comprising the step of initially providing substantially equal flow of glycol and water to said input lines.

3. The method of claim 2, further comprising the step of partially closing a pressure reducing valve on one of said input lines to provide said substantially equal flow.

4. The method of claim 1, further comprising the step of generating an error signal if said glycol concentration is outside a pre-determined tolerance range.

5. The method of claim 1, further comprising the step of modulating said at least one valve in response to said glycol concentration.

6. A method of automatically refilling a glycol supply tank for a glycol proportioning panel, comprising the steps of:
   (a) providing a microprocessor in communication with said glycol proportioning panel;
   (b) sending a tank level signal from said glycol supply tank to said microprocessor, said microprocessor thereby monitoring the level of glycol in said glycol supply tank;
   (c) upon said level of glycol in said glycol supply tank falling to a predetermined value, said microprocessor creating and sending an email message over a communications network to a glycol supplier; and
   (d) said glycol supplier transporting glycol to and filling said glycol supply tank in response to said email message.

* * * * *

UNITED STATES PATENT AND TRADEMARK OFFICE
CERTIFICATE OF CORRECTION

PATENT NO.         : 7,089,972 B2
APPLICATION NO. : 10/876366
DATED              : August 15, 2006
INVENTOR(S)        : Ken Kneringer et al.

Page 1 of 1

It is certified that error appears in the above-identified patent and that said Letters Patent is hereby corrected as shown below:

On the Title page item (60), please correct the filing date of Provisional Application No. 60/307,430 to read July 24, 2001.

Signed and Sealed this

Seventeenth Day of October, 2006

JON W. DUDAS
*Director of the United States Patent and Trademark Office*